(12) United States Patent
Wei (10) Patent No.: US 9,717,372 B2
(45) Date of Patent: Aug. 1, 2017

(54) QUICK CONNECTING DEVICE AND SHOWER ROOM ASSEMBLY

(71) Applicant: Foshan Ideal Co., Ltd., Foshan (CN)

(72) Inventor: Wuxiang Wei, Foshan (CN)

(73) Assignee: Foshan Ideal Co., Ltd. (CN)

( * ) Notice: Subject to any disclaimer, the term of this patent is extended or adjusted under 35 U.S.C. 154(b) by 0 days.

(21) Appl. No.: 15/100,562

(22) PCT Filed: Dec. 2, 2014

(86) PCT No.: PCT/CN2014/092797
§ 371 (c)(1),
(2) Date: May 31, 2016

(87) PCT Pub. No.: WO2016/078136
PCT Pub. Date: May 26, 2016

(65) Prior Publication Data
US 2016/0296079 A1 Oct. 13, 2016

(30) Foreign Application Priority Data

Nov. 21, 2014 (CN) .................... 2014 2 0708089 U (51) Int. Cl.
A47K 3/30 (2006.01)
A47K 3/34 (2006.01)
F16B 2/22 (2006.01)
F16S 3/06 (2006.01)

(52) U.S. Cl.
CPC .............. *A47K 3/30* (2013.01); *A47K 3/34* (2013.01); *F16B 2/22* (2013.01); *F16S 3/06* (2013.01)

(58) Field of Classification Search
CPC ..... A47K 3/30; A47K 3/34; F16B 2/22; F16S 3/06
USPC .......................................................... 4/607
See application file for complete search history.

(56) References Cited

U.S. PATENT DOCUMENTS

2009/0038070 A1  2/2009  Belanger et al.

FOREIGN PATENT DOCUMENTS

| CN | 202370272 U | 8/2012 |
|---|---|---|
| CN | 103519728 A | 1/2014 |
| DE | 3528435 A1 | 2/1987 |
| EP | 0628694 A1 | 12/1994 |

OTHER PUBLICATIONS

International Search Report for Application No. PCT/CN2014/092197 dated Aug. 3, 2015.

*Primary Examiner* — Tuan N Nguyen
(74) *Attorney, Agent, or Firm* — Lerner, David, Littenberg, Krumholz & Mentlik, LLP (57) ABSTRACT

A quick connecting device and a shower room assembly are disclosed. The quick connecting device comprises an inserting member, a receiving member and a locking key. The shower room assembly comprises a track connected at a corner uses the above quick connecting device.

10 Claims, 10 Drawing Sheets

QUICK CONNECTING DEVICE AND SHOWER ROOM ASSEMBLY

CROSS-REFERENCE TO RELATED APPLICATIONS

The present application is a national phase entry under 35 U.S.C §371 of International Application No. PCT/CN2014/092797 filed Dec. 2, 2014, which claims priority from Chinese Application No. 201420708089.2 filed Nov. 21, 2014, the disclosures all of which are hereby incorporated herein by reference.

TECHNICAL FIELD

The present invention relates to a quick connecting device specially used at a corner joint of a track used in a partitioned shower room, and a shower room assembly using the connecting device. The application is based on the Chinese utility model application No. 201420708089.2 filed on Nov. 21, 2014, the entire contents of which are incorporated herein by reference as a closely related reference material.

BACKGROUND ART

A shower room, based on its structure form, is divided into an integral type and a partitioned type. A partitioned-type shower room is a shower space partitioned from a partial area in a toilet or other buildings by a frame made of glass and having a wall and/or door. The frame with glass in the present invention is called as a shower room assembly.

Figure 1:
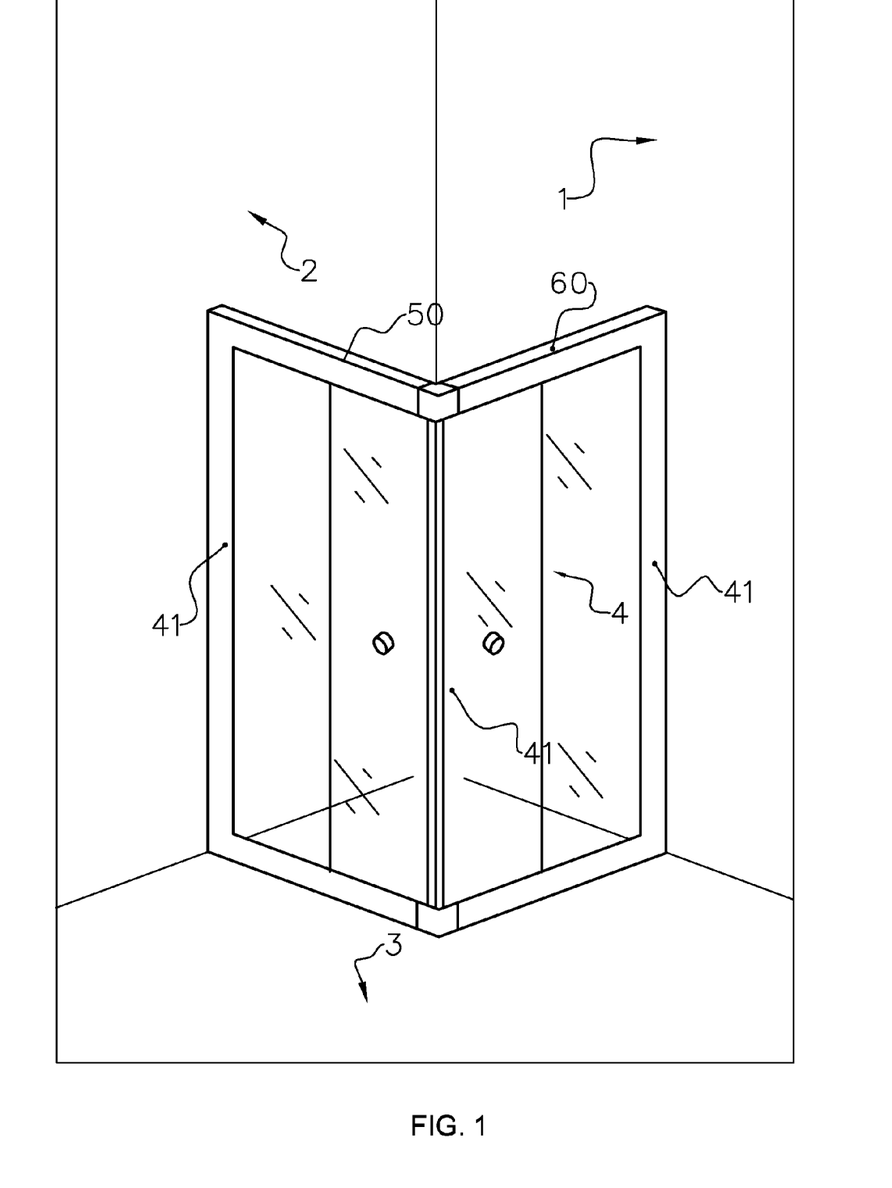
FIG. 1 is a schematic view of the shower room assembly partitioned in a building.

Referring to FIG. 1, a space in a building comprising walls 1, 2 vertical to each other and a ground 3 is partitioned by a shower room assembly 4 to form a shower room. The shower room assembly 4 includes a frame, as well as a glass wall and a door which are fixed within the frame. The frame is formed by connecting a plurality of vertical frames 41 arranged in a vertical direction and tracks 50, 60 arranged in a horizontal direction. A glass door in FIG. 1 may be a general door or a rail-mounted sliding door. It should also be pointed out that the tracks 50 and 60 in FIG. 1 in the horizontal plane have an angle of 90 degrees. That is, a corner formed at a joint of the corner is 90 degrees. In the prior art, the corner may be selected from other angles, for example, an angle of 135 degrees.

Technical Problem

With respect to a coupling structure at a joint of tracks 50, 60, a prior solution is to design a track coupling piece. Normals of two end faces of the coupling piece of the track are designed to be intersected and form a needed angle. That is, a main body of the coupling piece of the track forms a needed angle, and a screw hole is provided at two ends thereof. When mounted, the tracks 50, 60 are connected with two ends of the coupling piece of the track by a screw, respectively. This manner is relative time-consuming and labor-consuming for installation personnel.

Technical Solution

The main objective of the invention is to provide a quick connecting device for a track corner joint.

Another objective of the invention is to provide a shower room assembly formed by the quick connecting device.

To realize the main objective of the invention, the invention provides a quick connecting device specially used at a corner joint of a track used in a shower room assembly. The quick connecting device comprises an inserting member, a receiving member and a locking key. The inserting member comprises a sheet-like first body, the first body including a first connecting surface configured to fixedly connect an end surface of a corner end of a first track, a first main surface opposite to the first connecting surface, and a columnar insert extending outwards from the first main surface, a first keyway being formed on a surface of the columnar insert. The receiving member comprises a sheet-like second body, the second body including a second connecting surface configured to fixedly connect an end surface of a corner end of a second track, a second main surface opposite to the second connecting surface, and a receiver extending outwards from the second main surface, the receiver is provided with a receiving chamber in clearance fit with the columnar insert and is provided with a second keyway therein. The locking key is configured such that when the columnar insert is inserted into the receiving chamber and the first and second keyways are in a matched state, the locking key restricts exiting of the columnar insert from the receiving chamber.

According to a further solution, the first keyway has a circular segment-shaped cross section; the second keyway has a circular segment-shaped cross section; the cross sections form a complete circle when the first and second keyways are matched; and the locking key is a cylindrical key including a hand-held portion external to a locking orifice, and a key body at an intermediate portion thereof, a cross section of the key body being in the same shape with that of the cross section of the second keyway.

According to a further solution, an end of the key body away from the hand-held portion is an elastic exit-preventing portion.

According to a further solution, the columnar insert has a rectangular cross section, and the receiving chamber has a rectangular cross section.

According to a further solution, the quick connecting device further comprises a protective cover configured to cover the inserting member, the receiving member and the locking key which are assembled together, and having a pin therein extending downwards from a top wall thereof, a connecting rib being formed between the pin and an inner wall, wherein a protrusion extends outwards from at least one of the first and second main surfaces and is provided with an open pin hole matched with the pin.

To realize another objective of the invention, the invention provides a shower room assembly, comprising a frame and a door fixed within the frame, the frame being formed by connecting a vertical frame arranged in a vertical direction and a track arranged in a horizontal direction. The track at least comprises a first track and a second track connected at a corner by a quick connecting device. The quick connecting device comprises an inserting member, a receiving member and a locking key. The inserting member comprises a sheet-like first body, the first body including a first connecting surface configured to fixedly connect an end surface of a corner end of a first track, a first main surface opposite to the first connecting surface, and a columnar insert extending outwards from the first main surface, a first keyway being formed on a surface of the columnar insert. The receiving member comprises a sheet-like second body, the second body including a second connecting surface configured to fixedly connect an end surface of a corner end of a second track, a second main surface opposite to the second connecting surface, and a receiver extending outwards from the second main surface, wherein the receiver is provided with a receiving chamber to accommodate the columnar insert in clearance fit, and the receiver is provided with a second keyway therein. The locking key is configured such that when the columnar insert is inserted into the receiving chamber and the first and second keyways are in a matched state, the locking key restricts exiting of the columnar insert from the receiving chamber.

According to a further solution, the first keyway has a circular segment-shaped cross section; the second keyway has a circular segment-shaped cross section; the two cross sections form a complete circle when the first and second keyways are matched; and the locking key is a cylindrical key including a hand-held portion external to a locking orifice, and a key body at an intermediate portion thereof, a cross section of the key body being in the same shape with that of the cross section of the second keyway.

According to a further solution, an end of the key body away from the hand-held portion is an elastic exit-preventing portion.

According to a further solution, the columnar insert has a rectangular cross section, and the receiving chamber has a rectangular cross section.

According to a further solution, the quick connecting device further comprises a protective cover configured to cover the inserting member, the receiving member and the locking key which are assembled together, and having a pin therein extending downwards from a top wall thereof, a connecting rib being formed between the pin and an inner wall, wherein a protrusion extends outwards from at least one of the first and second main surfaces and is provided with an open pin hole matched with the pin.

Advantageous Effects

The quick connecting device of the invention has an advantage of quick assembly between the inserting member and the receiving member.

The shower room assembly of the invention has an advantage of simple and quick operations at the construction site.

The invention will be further described in the following embodiments with reference to the drawings.

EMBODIMENTS

With respect to a shower assembly of the invention and that in the prior art, as their main difference lies in that a quick connecting device is used as a coupling piece, each embodiment of the quick connecting device is described in detail in the followings. For the implementation of other portions of the shower room assembly, those skilled in the art is able to understand them through the prior art.

Embodiment 1 of a Quick Connecting Device

Figure 2:
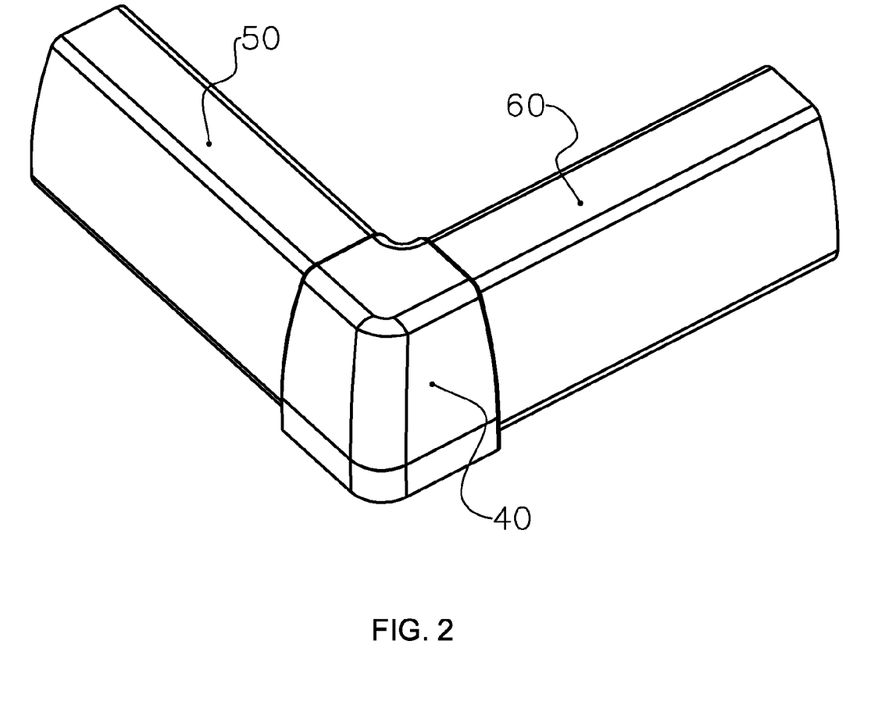
FIG. 2 is a perspective view of a first embodiment of the quick connecting device used at a 90-degree corner joint of the track.

Referring to FIG. 2, a first track 50 and a second track 60 are both profiles, and form a corner of 90 degrees at a joint therebetween. After the two tracks are connected by the quick connecting device, a protective cover 40 is provided to cover the quick connecting device.

Figure 3:
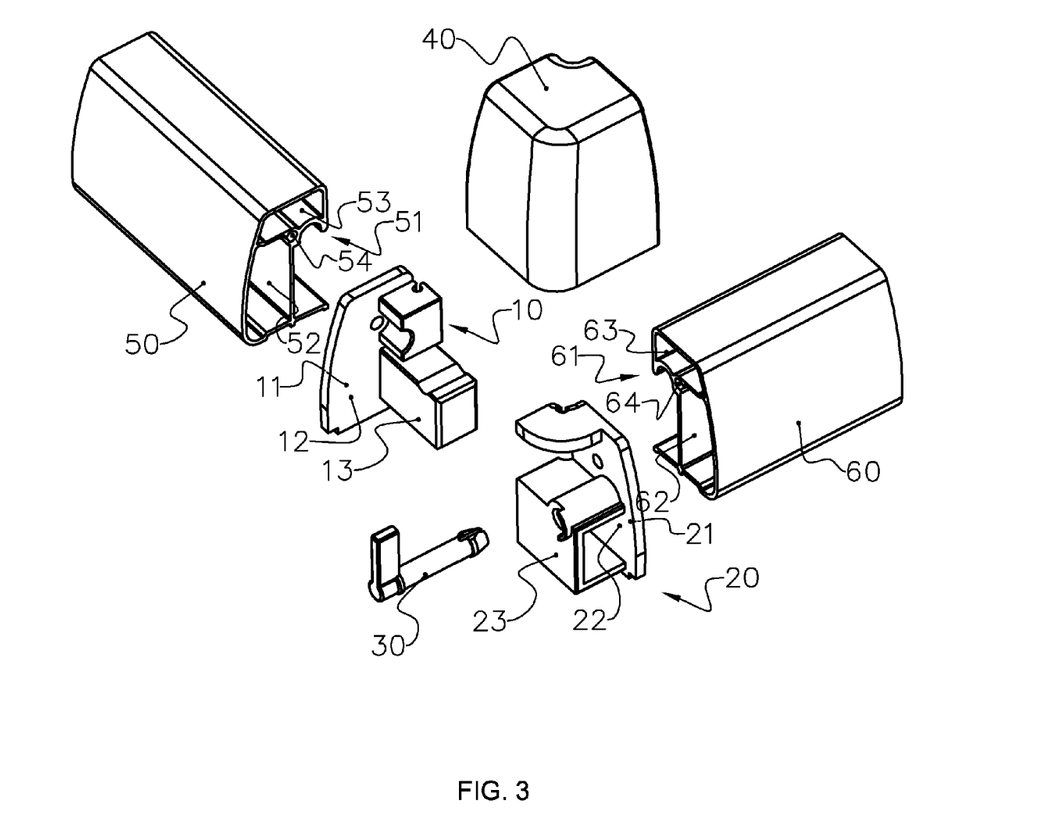
FIG. 3 is a structural exploded view of FIG. 2.

Referring to FIG. 3, a corner end of the first track 50 has a connecting surface 51 vertical to a length direction thereof. The connecting surface 51 forms enclosed chambers 52, 53 thereon and a bolt hole 54. A corner end of the second track 60 has a connecting surface 61 vertical to a length direction thereof. The connecting surface 61 forms enclosed chambers 62, 63 thereon and a bolt hole 64. A sheet-like first body of an inserting member 10 has a first connecting surface 11 configured to fixedly connect with the connecting surface 51 of the first track 50 and a first main surface 12 opposite to the first connecting surface. A columnar insert 13 extends outwards from the first main surface 12. A sheet-like second body of a receiving member 20 has a second connecting surface 21 configured to fixedly connect with the connecting surface 61 of the second track 60 and a second main surface 22 opposite to the second connecting surface. A receiver 23 extends outwards from the second main surface 22. The structure and function of a locking key 30 are described in the followings.

Figure 4:
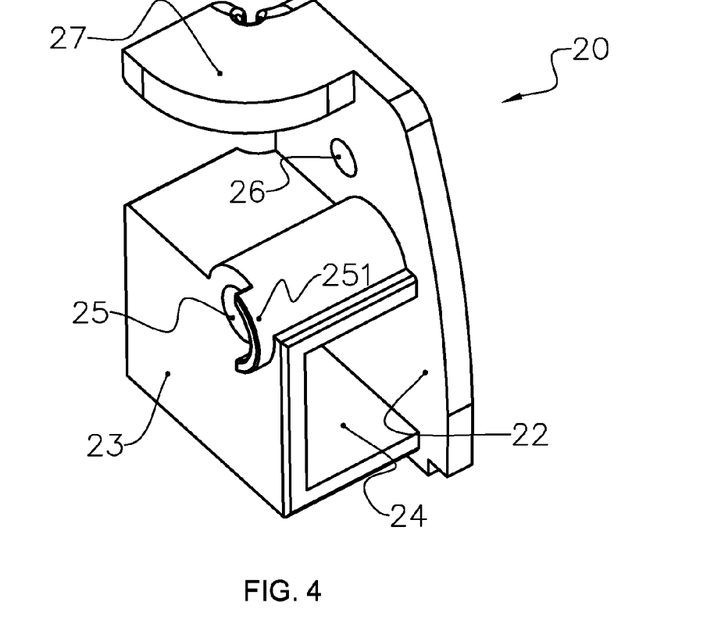
FIG. 4 is an enlarged perspective view of the receiving member in FIG. 3.
Figure 5:
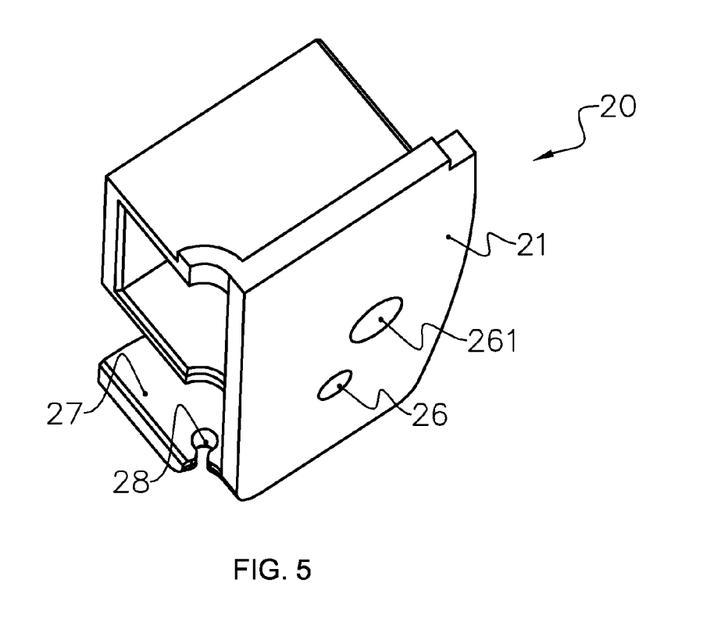
FIG. 5 is a perspective view of the receiving member in FIG. 4 from another viewpoint.

Referring to FIG. 4 and FIG. 5, the receiving member 20 extends outwards from the second main surface 22 and forms the receiver 23 with a cuboid receiving chamber 24. The receiver 23 is provided with a circular segment-shaped second keyway therein. The second keyway is aligned with and communicated with a locking orifice 25 on a wall of the receiver 23 and is coaxial with an exit-preventing axle hole 261 on the second body at the same time. A position of the second body corresponding to the bolt hole 64 is provided with an optical hole 26 passing through the second connecting surface 21 and the second main surface 22. A protrusion 27 extends outwards from the second main surface 22. One open pin hole 28 is formed on the protrusion 27. To facilitate the operation of the locking key, a rotation position-limiting convex strip 251 is provided beside the locking orifice 25.

Figure 6:
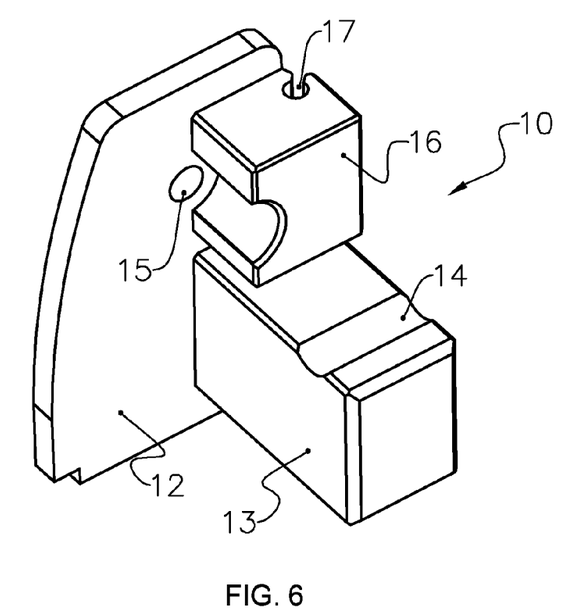
FIG. 6 is an enlarged perspective view of the inserting member in FIG. 3.
Figure 7:
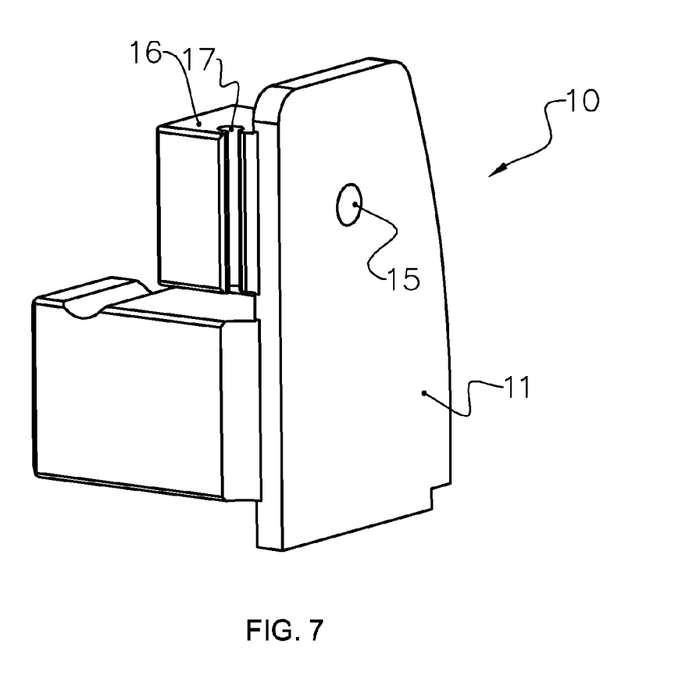
FIG. 7 is a perspective view of the inserting member in FIG. 6 from another viewpoint.

Referring to FIG. 6 and FIG. 7, the columnar insert 13 extends out from the first main surface 12 of the inserting member 10. An upper surface of the columnar insert 13 forms a circular segment-shaped first keyway 14. A position of the first body corresponding to the bolt hole 54 is provided with the optical hole 15 passing through the first connecting surface 11 and the first main surface 12. A protrusion 16 extends outwards from the first main surface 12. One open pin hole 17 is formed on the protrusion 16.

Figure 8:
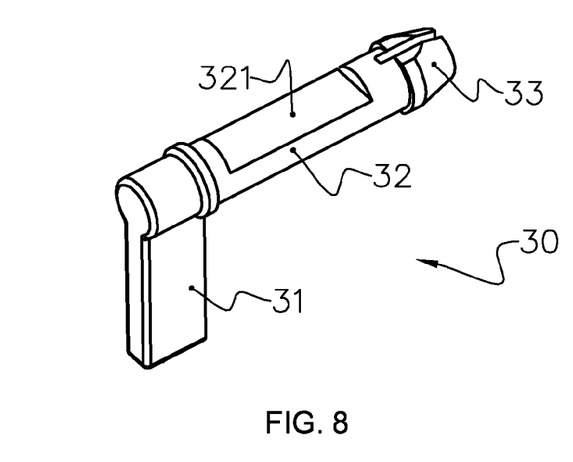
FIG. 8 is an enlarged perspective view of the locking key in FIG. 3.

Referring to FIG. 8, the locking key 30 is a cylindrical key. One end of the locking key is a hand-held portion 31 and an intermediate portion thereof is a key body 32. The key body 32 is a cylindrical body being partly cut out and forms one plane 321 so that the shape of the cross section of the key body 32 is the same as that of the second keyway. The other end of the locking key is an open elastic pinhead 33.

Figure 9:
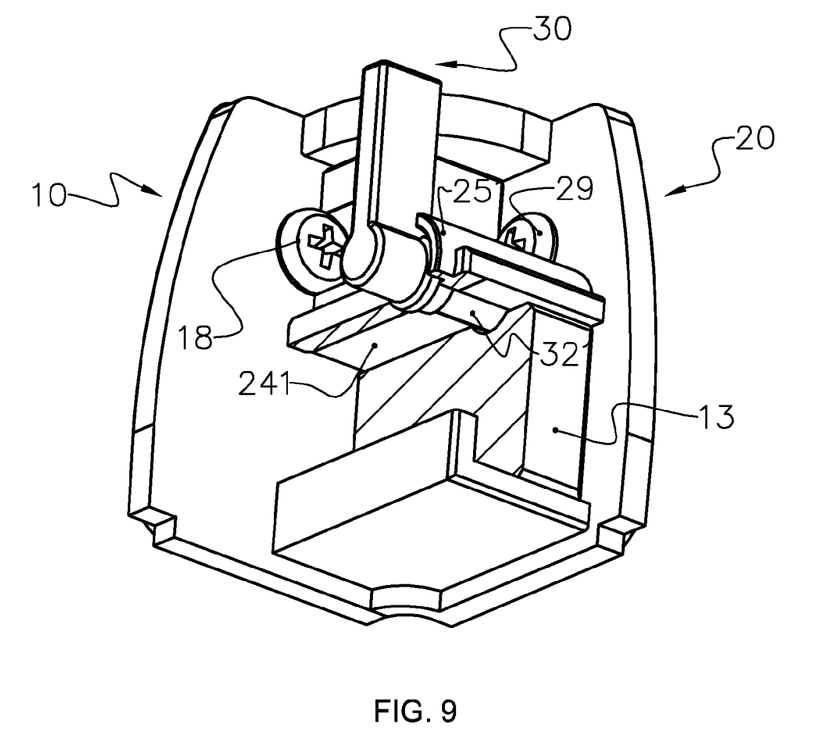
FIG. 9 is a perspective structural view of the first embodiment of the quick connecting device after assembly.

Referring to FIG. 9, to clearly describe the solution, FIG. 9 is a partial section view of the receiver 23 and the columnar insert 13. When a bolt 18 passes through the optical hole 15 and is fastened on the bolt hole 54, the inserting member 10 is fixed on the connecting surface 51 of the first track 50. Similarly, when the bolt 29 passes through the optical hole 26 and is fastened on the bolt hole 64, the receiving member 20 is fixed on the connecting surface 61 of the second track 60. The locking key 30 is pushed from the locking hole 25 by a force until the open elastic pinhead 33 passes through the exit-preventing axle hole 261. At this time, the locking key 30 is rotatably supported on the locking hole 25 and the exit-preventing axle hole 261. The hand-held portion 31 is operated to rotate the locking key 30 such that the plane 321 is aligned with an inner surface 241 of the receiving chamber 24, and stopped by the rotation position-limiting convex strip 251 as shown in FIG. 9, so that the columnar insert 13 can be inserted into the receiving chamber 24 and its positioned state is shown in FIG. 9. The hand-held portion 31 is operated to rotate the locking key 30 till an arc portion of the key body 32 enters into the first keyway 14; that is, the locking key is rotated to be stopped at the other end of the rotation position-limiting convex strip 251, which completes the main connection process of the quick connecting device. It should be noted that when the insert 13 enters into the receiving chamber 24, if there is a distance less than 3 mm to reach an ending position, the rotation of the locking key 32 can pull the insert 13 to reach the ending position.

Figure 10:
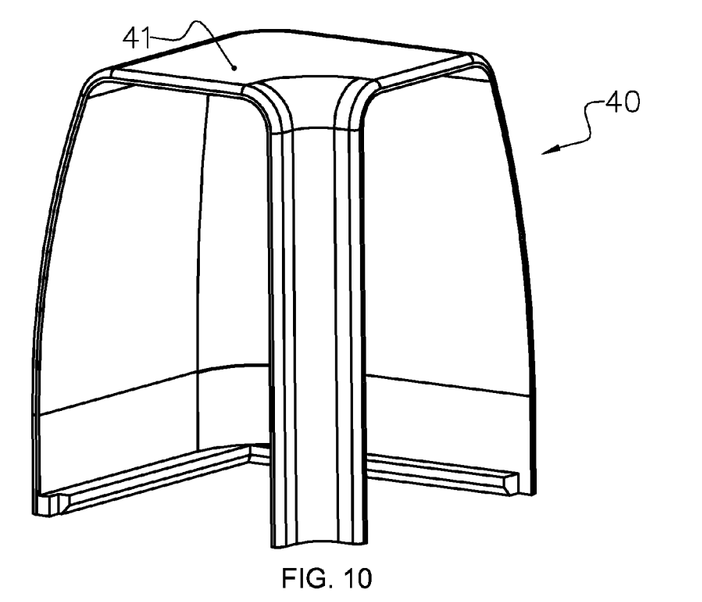
FIG. 10 is an enlarged perspective view of the protective cover in FIG. 3.
Figure 11:
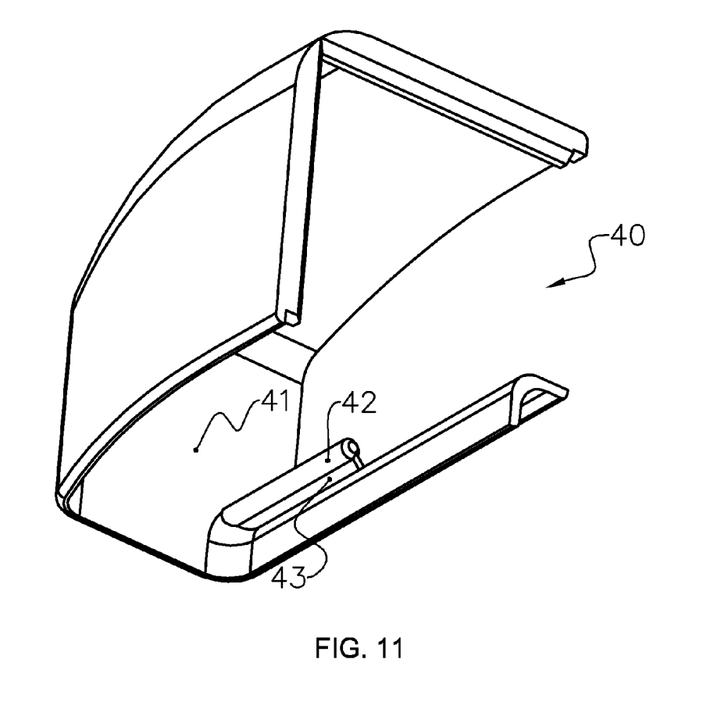
FIG. 11 is a perspective view of the protective cover in FIG. 10 from another viewpoint.

Referring to FIGS. 10 and 11, the main function of the protective cover 40 is to prevent dust at the corner joint and improve the appearance at the same time. A pin 42 extending from a top wall 41 downwards is provided inside the protective cover 40. A connecting rib 43 is formed between the pin 42 and an inner wall to prevent the pin 42 from being snapped by stress when the suspending arm is too long.

Under the state of FIG. 9, the open pin holes 28 and 17 are coaxial. When the protective cover is placed, the pin 42 passes through the open pin holes 28 and 17.

Embodiment 2 of a Quick Connecting Device

The structures of Embodiment 2 and Embodiment 1 are substantially identical, and only their differences are described in the followings.

Figure 12:
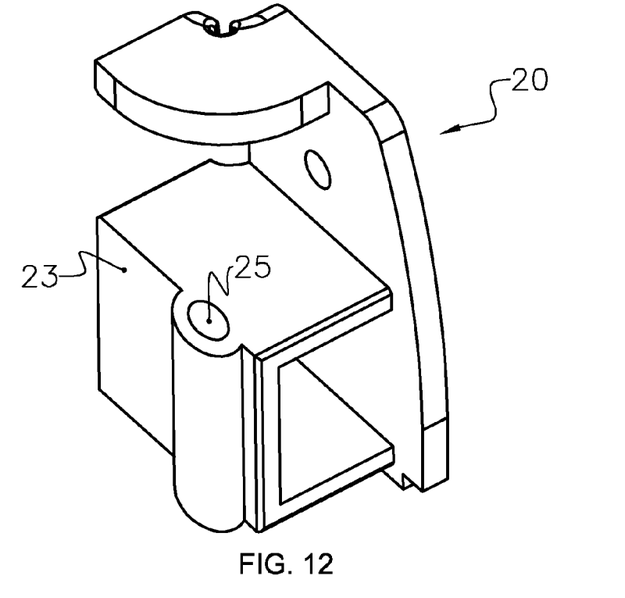
FIG. 12 is an enlarged perspective view of the receiving member of a second embodiment of the quick connecting device.

Referring to FIG. 12, with respect to this embodiment, the second keyway on the receiving member 20 is provided at an inner side of a vertical wall of the receiver 23. Therefore, the locking hole 25 is positioned at an upper surface of the receiver 23 while the exit-preventing axle hole 261 is positioned at a lower surface of the receiver 23.

Figure 13:
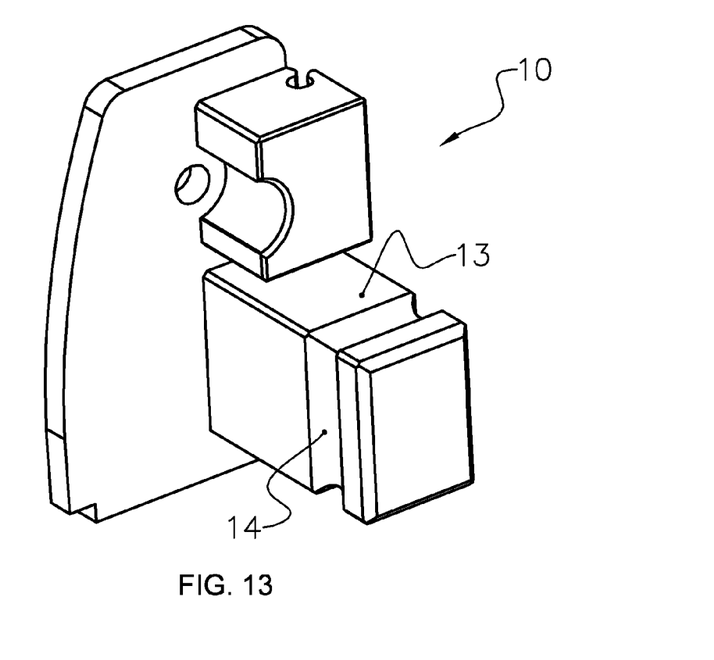
FIG. 13 is an enlarged perspective view of the inserting member of a second embodiment of the quick connecting device.

Referring to FIG. 13, the first keyway 14 on the inserting member 10 is provided on the corresponding vertical wall of the columnar insert 13. With the consideration of the universality of the inserting member 10 in this embodiment and the previous embodiment, the first keyway 14 is also provided to surround the columnar insert 13 by one circle or one half circle as shown in FIG. 13.

Embodiment 3 of a Quick Connecting Device

When the angle of the corner is relative big, for example, 135 degrees, the shapes of the columnar insert and the receiver may be slightly changed.

Figure 14:
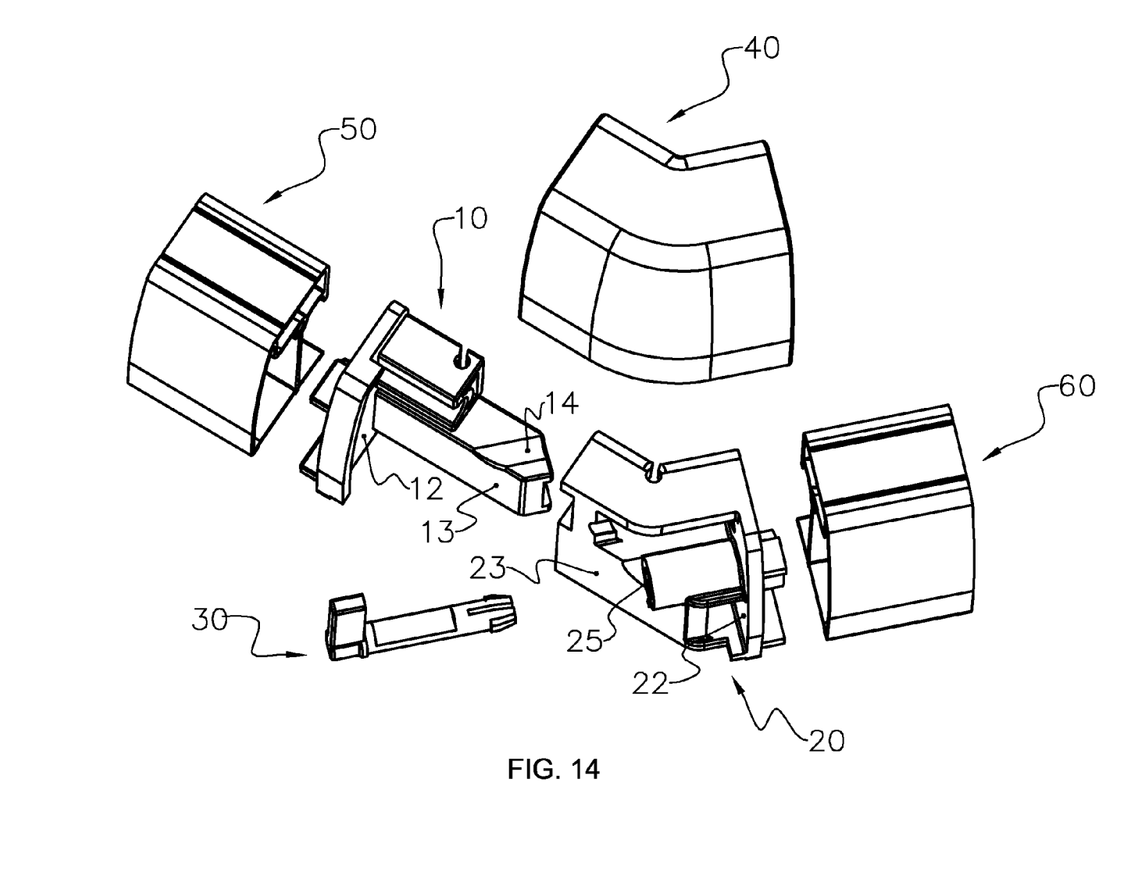
FIG. 14 is a structural exploded view of a third embodiment of the quick connecting device used at a 135-degree corner joint of the track.
Figure 15:
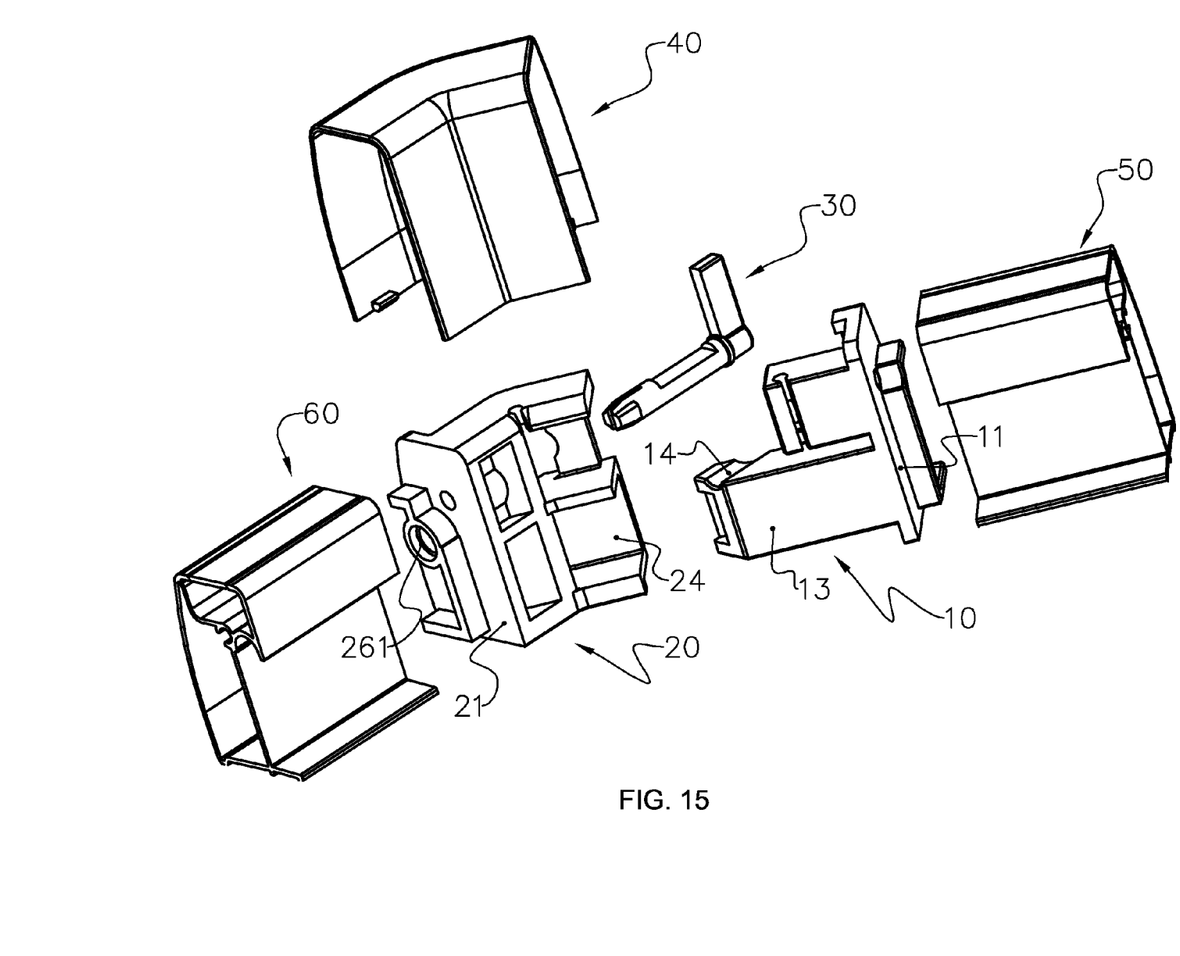
FIG. 15 is a view of FIG. 14 from another viewpoint.

Referring to FIGS. 14 and 15, in these two figures, the angle of the corner at the joint after assembly is 135 degrees. Reference numbers identical to that of the previous embodiments refer to the same names. The structures of the first track 50 and the second track 60 are identical to those of the previous embodiments. Only the dimension of the protective cover 40 is slightly changed. The structure of the locking key 30 is identical with that in the previous embodiments. The columnar insert 13 of the inserting member 10 extends outwards from the first main surface 12 and forms the circular segment-shaped first keyway 14 which is provided relatively obliquely on its outer surface. The receiver 23 of the receiving member 20 extends outwards from the second main surface 22 and is provided with the receiving chamber 24 therein. An inner wall of the receiver chamber 24 is provided with the circular segment-shaped second keyway therein. The second keyway is coaxial with the locking orifice 25 on a wall of the receiver 23 and the exit-preventing axle hole 261 on the second connecting surface 21. The fixing and connecting manners of the first connecting surface 11 and the first track 50 are the same with those of the previous embodiments. The fixing and connecting manners of the second connecting surface 21 and the second track 60 are also the same with those of the previous embodiments. The assembly manners and processes of the inserting member 10 and the receiving member 20, as well as the mounting orders of the locking key 30 and the protective cover 40 are also the same with those of the previous embodiments.

Other Embodiments

The present invention is not limited to the above embodiments, and the following changes are also able to realize the objectives of the invention.

Referring to FIG. 3, a connecting body extends outwards from the first connecting surface 11. The section shape of the connecting body is the same with that/those of the enclosed chamber 52 and/or the enclosed chamber 53. Both of them are in interference fit or clearance fit with glue, so that the inserting member 10 and the first track 50 are fixedly connected and the receiving member 20 and the second track 60 are also fixedly connected similarly.

The locking key 30 may be designed in a structure form of a flat key. Correspondingly, the first keyway and the second keyway are designed based on the dimensions of the cross sections of the flat key.

The cross sections of the insert 13 and the receiving chamber 24 may also be designed to be circular or circular segmental.

When the angle of the corner of the first track 50 and the second track 60 is 120 degrees, Embodiment 1 is also realized by simply improving and designing a structure of a first body. The first connecting surface 11 and the first main surface 12 are designed to have a certain included angle to make an outer profile of the first body be a wedge-like body. A structure of a second body is similarly improved so that a sum of the included angles of two wedge-like body is 30 degrees. A corner end of the track may also be beveled, such that the angle of intersection between the connecting surface 51 and the axis of the first track 50 is 15 degrees, and the angle of intersection between the connecting surface 61 and the axis of the second track 60 is 15 degrees.

INDUSTRIAL APPLICABILITY

The assembly speed of the quick connecting device of the present invention is very fast: by drawing the inserting member and the receiving member closer to allow the columnar insert to be inserted into the receiving chamber, a key connection between the columnar insert and the receiver can be established by operating the locking key.

The operation of the shower room assembly of the present invention is simple and fast: the inserting member and the receiving member can be firmly connected by mounting the locking key to the receiving member first, rotating the locking key to allow the columnar insert smoothly enter into the receiving chamber, and rotating the locking key again.

The invention claimed is:

1. A quick connecting device configured to connect a track of a shower room assembly at a corner, characterized by comprising:
    an inserting member comprising a sheet-like first body, the first body including a first connecting surface configured to fixedly connect an end surface of a corner end of a first track, a first main surface opposite to the first connecting surface, and a columnar insert extending outwards from the first main surface, a first keyway being formed on a surface of the columnar insert;
    a receiving member including a sheet-like second body, the second body including a second connecting surface configured to fixedly connect an end surface of a corner end of a second track, a second main surface opposite to the second connecting surface, and a receiver extending outwards from the second main surface, the receiver being provided with a receiving chamber in clearance fit with the columnar insert and the receiver being provided with a second keyway therein; and
    a locking key configured such that when the columnar insert is inserted into the receiving chamber so that the first and second keyways are in a matched state, the locking key restricts exiting of the columnar insert from the receiving chamber.

2. The quick connecting device according to claim 1, wherein:
    the first keyway has a circular segment-shaped cross section;
    the second keyway has a circular segment-shaped cross section;
    the two cross sections form a complete circle when the first and second keyways are matched; and
    the locking key is a cylindrical key including a hand-held portion external to a locking orifice and a key body at an intermediate portion thereof, a cross section of the key body being in the same shape with that of the cross section of the second keyway.

3. The quick connecting device according to claim 2, wherein: an end of the key body away from the hand-held portion is an elastic exit-preventing portion.

4. The quick connecting device according to claim 3, wherein: the columnar insert has a rectangular cross section, and the receiving chamber has a rectangular cross section.

5. The quick connecting device according to claim 1, further comprising:
    a protective cover configured to cover the inserting member, the receiving member and the locking key which are assembled together, and having a pin therein extending downwards from a top wall thereof, a connecting rib being formed between the pin and an inner wall, wherein
    a protrusion extends outwards from at least one of the first and second main surfaces and is provided with an open pin hole matched with the pin.

6. A shower room assembly, comprising:
    a frame and a door fixed within the frame, the frame being formed by connecting a vertical frame arranged in a vertical direction and a track arranged in a horizontal direction, the track at least comprising a first track and a second track connected at a corner by a quick connecting device,
    wherein the quick connecting device comprises:
    an inserting member comprising a sheet-like first body, the first body including a first connecting surface configured to fixedly connect an end surface of a corner end of a first track, a first main surface opposite to the first connecting surface, and a columnar insert extending outwards from the first main surface, a first keyway being formed on a surface of the columnar insert;
    a receiving member including a sheet-like second body, the second body including a second connecting surface configured to fixedly connect an end surface of a corner end of a second track, a second main surface opposite to the second connecting surface, and a receiver extending outwards from the second main surface, the receiver being provided with a receiving chamber in clearance fit with the columnar insert and the receiver being provided with a second keyway therein; and
    a locking key configured such that when the columnar insert is inserted into the receiving chamber and the first and second keyways are in a matched state, the locking key restricts exiting of the columnar insert from the receiving chamber.

7. The shower room assembly according to claim 6, wherein:
    the first keyway has a circular segment-shaped cross section;
    the second keyway has a circular segment-shaped cross section;
    the two cross sections form a complete circle when the first and second keyways are matched; and
    the locking key is a cylindrical key including a hand-held portion external to a locking orifice, and a key body at an intermediate portion thereof, a cross section of the key body being in the same shape with that of the cross section of the second keyway.

8. The shower room assembly according to claim 7, wherein: an end of the key body away from the hand-held portion is an elastic exit-preventing portion.

9. The shower room assembly according to claim 8, wherein: the columnar insert has a rectangular cross section, and the receiving chamber has a rectangular cross section.

10. The shower room assembly according to claim 6, further comprising:
    a protective cover configured to cover the inserting member, the receiving member and the locking key which are assembled together, and having a pin therein extending downwards from a top wall thereof, a connecting rib being formed between the pin and an inner wall, wherein a protrusion extends outwards from at least one of the first and second main surfaces and is provided with an open pin hole matched with the pin.

\* \* \* \* \*